(12) United States Patent  (10) Patent No.: US 8,734,646 B1
Schuh et al.  (45) Date of Patent: May 27, 2014

(54) BIOREMEDIATION TREATMENT FOR HUMAN SANITARY WASTE

(71) Applicants: Allen John Schuh, Pleasanton, CA (US); Jordan Timothy Porter, San Ramon, CA (US); Jake Timothy Porter, San Ramon, CA (US)

(72) Inventors: Allen John Schuh, Pleasanton, CA (US); Jordan Timothy Porter, San Ramon, CA (US); Jake Timothy Porter, San Ramon, CA (US)

( * ) Notice: Subject to any disclaimer, the term of this patent is extended or adjusted under 35 U.S.C. 154(b) by 0 days.

(21) Appl. No.: 14/051,830

(22) Filed: Oct. 11, 2013

Related U.S. Application Data

(60) Provisional application No. 61/845,252, filed on Jul. 11, 2013.

(51) Int. Cl.
*C02F 3/32* (2006.01)

(52) U.S. Cl.
USPC ............. 210/602; 210/610; 210/94; 210/252; 210/322; 210/903

(58) Field of Classification Search
CPC .. C02F 2101/16; C02F 2101/18; C02F 3/322; C02F 3/325
USPC ............. 210/602, 610, 611, 631, 198.1, 199, 210/252, 322, 94, 903
See application file for complete search history.

(56) References Cited

U.S. PATENT DOCUMENTS

| | | | |
|---|---|---|---|
| 276,261 A | 4/1883 | McGinley | |
| 1,021,763 A | 4/1912 | Crow | |
| 3,695,434 A | * 10/1972 | Whitten, Jr. | ............... 210/747.5 |
| 3,744,634 A | 7/1973 | Schlenz | |
| 3,772,188 A | 11/1973 | Edwards | |
| 4,536,902 A | 8/1985 | McGill | |
| 4,966,705 A | 10/1990 | Jamieson et al. | |
| 5,500,962 A | 3/1996 | Tagg | |
| 5,578,200 A | 11/1996 | Funakoshi et al. | |
| 6,013,180 A | 1/2000 | Wang | |
| 6,146,531 A | 11/2000 | Matheson | |
| 6,287,469 B1 | 9/2001 | Ashburn et al. | |
| 6,312,592 B1 | 11/2001 | Kaltchev | |
| 6,358,411 B1 | 3/2002 | McKinney | |
| 6,398,965 B1 | 6/2002 | Arba et al. | |
| 7,217,358 B2 | 5/2007 | Evans | |
| 7,468,135 B2 | 12/2008 | Holt | |
| 8,017,366 B1 | 9/2011 | Schuh et al. | |
| 8,137,717 B1 | 3/2012 | Schuh et al. | |

(Continued)

OTHER PUBLICATIONS

Department of Homeland Security (DHS)/Federal Emergency Management Agency (FEMA) Special Events Contingency Planning Job Aids Manual, Mar. 2005, pp. 2-28 and 2-29.

*Primary Examiner* — Fred Prince
(74) *Attorney, Agent, or Firm* — David Pressman

(57) ABSTRACT

A system for converting urine into potable water for drinking and use in a hand washing station (165) comprises a commode (100), a three-way valve (110) at the outlet of the commode, a urine reactants tank (145), a storage container (160), a pump (170), and a spigot (175). A user turns an actuator (111) on the valve in one direction to direct feces and feces-plus-urine into a reactants tank for feces, and in another direction to direct urine into the urine reactants tank. The urine reactants tank contains a plurality of baffles (210) separating the tank into chambers. A first chamber contains algae and microorganisms supplied by a seed (150). These organisms absorb nutrients from the urine as they grow into a mass (152). A last chamber contains only purified water which flows from the tank into the storage container from which it can be pumped to the spigot.

13 Claims, 1 Drawing Sheet

(56) References Cited

U.S. PATENT DOCUMENTS

| | | |
|---|---|---|
| 8,187,861 B1 | 5/2012 | Schuh |
| 8,354,030 B1 | 1/2013 | Schuh |
| 2004/0195181 A1* | 10/2004 | Loftis .......................... 210/660 |
| 2009/0065412 A1* | 3/2009 | Mbarki et al. ................ 210/151 |
| 2012/0021494 A1* | 1/2012 | Krebs ........................ 435/252.1 |

* cited by examiner

BIOREMEDIATION TREATMENT FOR HUMAN SANITARY WASTE

CROSS-REFERENCE TO RELATED APPLICATION

This application claims priority of Provisional Patent Application Ser. No. 61/845,252, filed 11 Jul. 2013, by the present inventors.

BACKGROUND

Prior Art—Disposal of Human Waste Products

In the past, humans deposited their body waste directly or indirectly into a latrine, i.e., a pit in the ground or another type of outdoor toilet. Open trenches were also used to convey sewage away from populated areas. In many locations, these primitive disposal methods have given way to chemical toilets that treat and retain waste, and to sanitary sewer piping and flush toilets that urge sewage away from populated areas and into sewage treatment plants. In other locations, such as underdeveloped countries, the old methods persist in various forms.

In underdeveloped countries worldwide, people practice open defecation and lack adequate sanitation facilities. Inadequate sanitation is a major cause of disease. Many disease-causing microbes are eliminated in feces, only to be reintroduced in food and water supplies, thereby continuing the cyclic spread of disease. Fecal contamination of food and water spreads diarrhea, typhoid, cholera, poliomyelitis, hepatitis, and other microbial diseases. There are numerous non-microbial sources of disease. For example, *Ascaris lumbricoides* is a parasitic nematode worm that is spread by unsanitary conditions and causes fever and diarrhea.

Worldwide practices of cleansing of the anal region after a bowel movement range from wiping with a hand, stick, leaf, sponge, stone, or other implement to wiping with tissue, sometimes accompanied by rinsing with water (e.g., with a bidet), and flushing the tissue and rinse water into a sanitary sewer. Washing of hands by any of these methods is important because it reduces the spread of disease by removing pathogens from the hands. However in some locations, there is insufficient water for washing of hands and disease can spread. Urine has been suggested as a substitute for clean water when cleaning one's hands after defecation because in healthy people it is nearly sterile, but because it contains bodily waste it is not hygienically suitable.

Various methods are known for processing urine to make it hygienically acceptable and even potable. The following is a list of some prior-art methods:

| Pat. or Pub. No. | Kind Code | Issue or Pub. Date | Patentee or Applicant |
|---|---|---|---|
| 276,261 | B1 | Apr. 24, 1883 | McGinley |
| 1,021,763 | B1 | Apr. 02, 1912 | Crow |
| 3,744,634 | B1 | Oct. 10, 1973 | Schlenz |
| 3,772,188 | B1 | Nov. 13, 1973 | Edwards |
| 4,536,902 | B1 | Aug. 27, 1985 | McGill |
| 4,966,705 | B1 | Oct. 30, 1990 | Jamieson et al. |
| 5,500,962 | B1 | Mar. 26, 1996 | Tagg |
| 5,578,200 | B1 | Nov. 26, 1996 | Funakoshi et al. |
| 6,013,180 | B1 | Jan. 11, 2000 | Wang |
| 6,146,531 | B1 | Nov. 14, 2000 | Matheson |
| 6,287,469 | B1 | Sep. 11, 2001 | Ashburn et al. |
| 6,312,592 | B1 | Nov. 06, 2001 | Kaltchev |
| 6,358,411 | B1 | Nov. 19, 2002 | McKinney |

-continued

| Pat. or Pub. No. | Kind Code | Issue or Pub. Date | Patentee or Applicant |
|---|---|---|---|
| 6,398,965 | B1 | Jun. 04, 2002 | Arba et al. |
| 7,217,358 | B2 | May 15, 2007 | Evans |
| 7,468,135 | B2 | Dec. 23, 2008 | Holt |
| 8,017,366 | B1 | Sep. 13, 2011 | Schuh et al. |
| 8,137,717 | B1 | Mar. 20, 2012 | Schuh et al. |
| 8,187,861 | B1 | May 29, 2012 | Schuh |
| 8,354,030 | B1 | Jan. 15, 2013 | Schuh |

NON-PATENT LITERATURE DOCUMENTS

Department of Homeland Security (DHS)/Federal Emergency Management Agency (FEMA) Special Events Contingency Planning Job Aids Manual, March 2005, Pp. 2-28 and 2-29.

In the above references, McGinley shows the basic design of a wall-mounted urinal that is in use today.

Crow shows a "dry closet" toilet that collects urine and feces separately. A user sits on the seat of his apparatus and positions the output orifice of their urethra over a trough at the front edge of the toilet then urinates and defecates. Odor reducing means are included.

Schlenz shows a self-contained sewage treatment plant. A settling tank is surrounded by an annular channel into which one or more motor driven, rotatable discs depend. As the discs rotate, they aerate, agitate, and circulate sewage that is contained in the channel. Substantially pure water is removed from the surface of the liquid in the settling tank and used for irrigation purposes.

Edwards shows a sewage treatment apparatus and method using an enclosed pressurized vessel in which mainly liquid sewage is treated using mechanical disruption along with exposure to oxygen and ozone.

McGill shows a toilet assembly having a base, a support, a receptacle, a seat with a lid, and a sump. The lid forms a seal with the seat when the lid is closed, preventing the escape of odors. Some of the liquid in the waste in a receptacle is automatically released into the ground.

Jamieson shows a waste water treatment plant and process for use in small communities. The plant comprises an inlet, an aeration tank, a baffled reaction tank, and control means including a plurality of pumps and level switches to allow substantial settling of sludge in the aeration tank.

Tagg shows an outdoor toilet cabana, i.e. an enclosed, portable outdoor toilet. Waste is collected in a holding tank for later disposal.

Funakoshi shows a sewage treatment system that cleans sewage by filtering solid components in the sewage using a floating filter medium in a tank. The floating filter medium is washed using air jets that agitate the medium in a circular fashion, thereby scraping off solids that adhere to the filter medium for subsequent discharge outside the treatment tank.

Wang shows a mineral filtering apparatus in which raw water placed in an inlet box is urged by gravity to flow through a plurality of passive filters, including deodorizing, ion-exchange, sterilizing, and magnetizing processes on its way to a reservoir. A mineral stone barrel in the storage reservoir contains beneficial water-soluble mineral substances that are released into the water.

Matheson shows a process and apparatus for biologically treating water. The process comprises the steps of: removing at least a portion of a predetermined substance from the water by exposing the water to microorganisms capable of removing the substance, and feeding a biostimulant to the microorganisms in order to improve the rate of removal of the substance.

Ashburn shows a home wastewater treatment plant that treats sewage using naturally-occurring microorganisms after the sewage has passed from a septic tank or other primary treatment device. A septic tank receives the solid component of sewage and a treated effluent from a later stage. The heavy solids settle to the bottom of the tank and the lighter solid material floats to the top. The solid components decompose into liquids and gases in an anaerobic environment. Effluent from the middle of the septic tank flows into a bottom mixing zone of a recirculation tank. A pump moves the effluent from the bottom of the recirculation tank to the top where it is distributed over a sand filter located in the top zone of the recirculation tank. Aerobic and anaerobic microorganisms in the sand treat the effluent and it is eventually discharged from the system, after which it can be disinfected.

Kaltchev shows a clarifier for liquids that are laden with suspended matter.

McKinney shows a compact wastewater treatment plant comprising two containment vessels. A first vessel comprises a pretreatment vessel and a holding vessel, and a second vessel is an aerobic treatment chamber. An air pump is used to provide air for use in the aerobic treatment chamber. A submersible pump in the holding chamber discharges water from the plant.

Arba shows a water treatment system and process for removing weakly ionized and/or organic materials from water by pH (acid/base) adjustment. Chemical treatments and reverse osmosis are used to purify water.

Evans shows a method and apparatus for the ultraviolet radiation treatment of unwanted microorganisms in water. The apparatus treats water alone or objects, such as freshly cut pieces of fruit, suspended in water.

Holt shows a portable tank wastewater treatment system and method. Potable water, non-potable, and black water tanks contain generators positioned to provide oxygen, ozone, or a combination of the two to the water in the tank.

Schuh '366 shows a self-contained biofuel production and water processing apparatus. This apparatus uses either a yeast or a bacterial culture at predetermined temperatures to produce methane or ethanol. The ethanol can be converted to biodiesel using a transesterfication process. A still separates ethanol and water for later use.

Schuh '717 shows a system for producing humanly edible food from *Jatropha curcas* L. or a similar plant or an algae. A bioreaction tank contains a mixture of starting ingredients and water that is provided from a local source. Fermentation occurs within the tank, various treatments extract toxins from the plant or algae material, and an edible mash and a mixture of ethanol and water remain. After fermentation, the toxins are discarded, the mash is available as a safe food stock, and the ethanol and water are separated in a still. The water is returned to its source and the ethanol is retained for use as a fuel for providing heat for use in the fermentation process.

Schuh '861 shows an electrolytic system and process for extracting phosphorous from algae in a body of water.

Schuh '030 shows an electrolytic purification system for cyanotoxic-contaminated water.

The DHS-FEMA manual lists requirements for water supplies and toilets for use at public events. Adequate drinking water must be provided, and toilets must be near hand-washing stations. An additional requirement is the pumping-out of portable toilets, which requires vehicle access.

Numerous prior-art systems remove pathogens and separate solids from liquids in sewage with an end product of relatively pure water and decontaminated solid waste. However these systems are often large, use large volumes of water for flushing waste to a remote treatment facility, and require large amounts of energy to separate urine and mingled feces.

Crow shows a commode that separates urine from feces using two different pathways, i.e., feces are deposited in the bowl while urine is collected in a trough. The feces are held for later collection and the urine is "conducted to a point remote from the closet".

Wang, Matheson, Kaltchev, McKinney, Arba, Evans, and Schuh show water treatment systems that decontaminate wastewater or remove solids other than sewage using filtration, chemicals, settling, and the like. Schuh also shows electrical discharge systems for purifying contaminated water, bioreactors that remove toxins from plant products, and a system for producing biofuel from algae while also purifying water.

The remaining references show treatment plants for sewage comprising both feces and urine.

With the exception of Crow, the prior-art solutions to human waste disposal require an external clean water source for flushing, sources of energy to drive pumps and other treatment equipment, an ultraviolet light source, chemicals, and the like. Many are not portable, and hence may not be usable in case of disasters such as extreme weather events. As noted above, washing of hands is the single most effective way to prevent the spread of communicable diseases and is a necessary part of any sanitation effort. None of the prior-art systems provide water for washing hands.

SUMMARY

According to one aspect human liquid and solid waste, after deposit into a bowl, are separated according to type, by a three-way valve (off, solid and solid plus liquid, and liquid) and conducted to a solid treatment or liquid treatment apparatus where the waste is appropriately digested to a hygienic form or converted to potable water by bioremediation. Urine and urine mingled with feces are collected in a commode are processed separately. The urine is processed using sunlight in combination with the water content and nutrients present in urine to grow algae, which in turn render the water suitable for drinking and washing of hands. There are four main components to the apparatus: (1) a commode collection device, (2) a hand washing station, (3) a urine-to-washing-water reaction tank, and (4) a urine-mingled-with-feces-to-fuel reaction tank. Urine is treated differently than urine-mingled-with-feces. If the two are mingled there is no attempt to separate out the urine. The apparatus is a complete, transportable, and low cost lavatory facility that is suitable for use worldwide, in both developed and underdeveloped localities. It does not require an outside water source, electricity, or an external sewer connection, yet it provides better sanitation, dignity, privacy, and personal safety to all who use it. Our system solves the problem of providing potable water for drinking or washing of hands but does not require water for flushing or any source of energy to drive pumps and treatment equipment, chemicals, and the like.

DRAWING FIGURES

Figure 1:
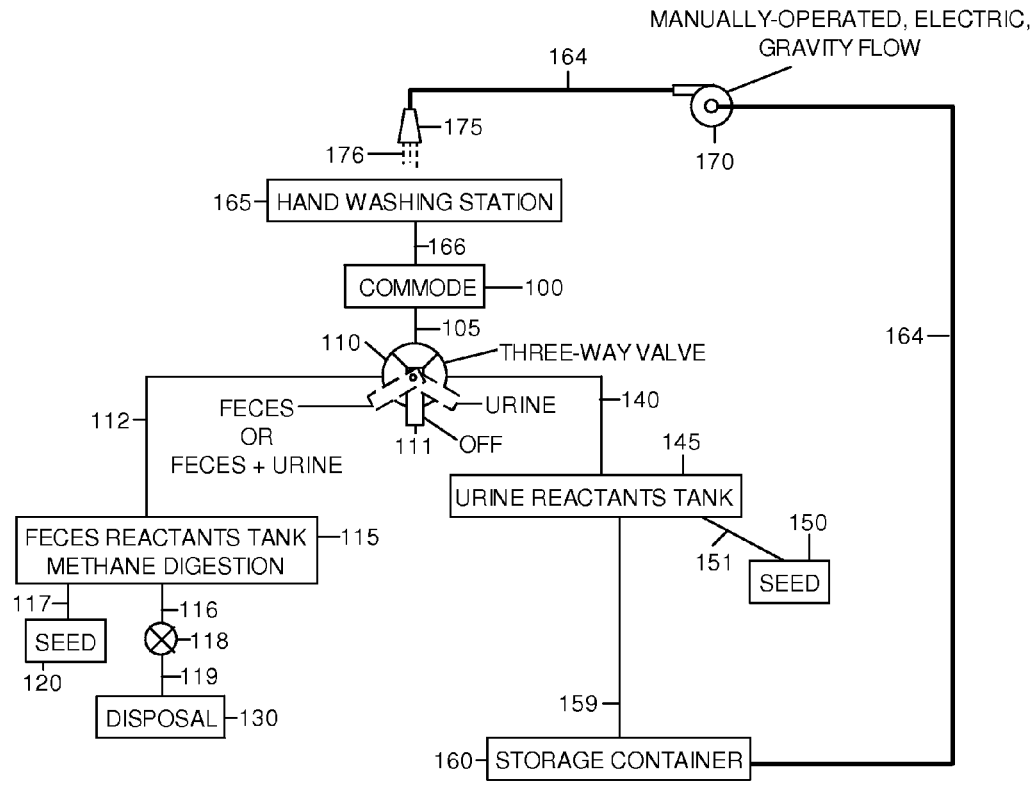
FIG. 1 is a flow chart showing the paths taken by urine and feces in one aspect of an embodiment.

| REFERENCE NUMERALS | |
|---|---|
| 100 | Commode |
| 105 | Conduit-commode |
| 110 | Valve on commode |
| 111 | Actuator |
| 112 | Conduit-feces |
| 115 | Reactants tank-feces |
| 116 | Conduit-feces |
| 117 | Conduit-seed source to feces tank |
| 118 | Valve-feces |
| 119 | Conduit-feces disposal |
| 120 | Seed-feces |
| 130 | Vessel-feces |
| 140 | Conduit-urine |
| 145 | Tank-urine |
| 150 | Seed-urine |
| 151 | Conduit-seed to urine tank |
| 152 | Mass |
| 159 | Conduit-storage |
| 160 | Container |
| 164 | Conduit-water |
| 165 | Station |
| 166 | Conduit-wash water |
| 170 | Pump |
| 175 | Spigot |
| 176 | Water |
| 200 | Base |
| 205 | Lid |
| 210 | Baffle |
| 215 | Vent |
| 220 | Base |

FIRST EMBODIMENT

Description—FIG. 1

FIG. 1 is a flow chart showing our system and how separate paths are used for the treatment of urine and feces according to one aspect of a first embodiment.

A commode 100 resembles an ordinary toilet. Commode 100 comprises a bowl with a seat at its upper side and an exit conduit 105 at its lower side. Alternatively, commode 100 is a well-known squat toilet with an exit conduit 105 at its lowest point. Both are made of metal, ceramic, glass, plastic, or reinforced plastic.

Conduit 105 connects commode 100 to a normally closed, three-way valve 110. Two conduits 112 and 140 are connected to individual outlets of valve 110. Valve 110 has a manually-operated actuator or operating handle or lever 111. Alternatively handle or lever 111 may be an electrical or electronic control that operates valve 110 by means of solenoids or other electrically driven means.

When actuator 111 is in its center position, valve 110 is OFF; all substances entering commode 100 and conduit 105 are stopped at the inlet to valve 110.

When actuator 111 is rotated clockwise, i.e., so that its handle is in its left-most position, conduit 105 is connected to conduit 112. This position is used when a user intends to deposit feces only or feces plus urine into commode 100.

When actuator 111 is rotated counterclockwise, i.e., so that its handle is in its right-most position, conduit 105 is connected to conduit 140. This position is used when a user intends to deposit urine only into commode 100.

The interior walls of commode 100, conduits 105, 112, and 140 and valve 110 can be coated with a hydrophobic, nonstick substance such as polytetrafluoroethylene (PTFE—sold under the trademark TEFLON by E. I. DuPont de Nemours & Co. Corp., Wilmington, Del.) to facilitate the flow of waste into and through the various conduits and to prevent the waste from adhering to such walls.

A feces reactants tank 115 receives feces or feces-plus-urine from conduit 112 when actuator 111 is in its left-most position. A chemical seed 120 of yeast and microorganisms in various proportions is added to tank 115 by pouring from a container or via a conduit 117. Here a seed is any material that is added to a container of a substance to start a specific known reaction in a predictable way. A suitable seed for tank 115 designed to receive waste for a family of four contains 100 grams of yeast and sewage-degrading microorganisms, including *Bacillus* spp and *Lactobacillus* spp. (Spp=plural species.) The Spp of *Lactobacillus* include *L. acidophilus, L. delbrueckii, L. helveticus, L. salivarius, L. casei, L. curvatus, L. plantarum, L. sakei, L. brevis, L. buchneri, L. fermentum,* and *L. reuteri*. The seed bacteria should also contain a culture comprising a variant of the genus *Methanobacterium*, the Spp of which include *M. aarhusense, M. alcaliphilum, M. beijingense, M. bryantii, M. congolense, M. curvum, M. espanolae, M. formicicum, M. ivanovii, M. oryzae, M. palustre, M. subterraneum, M. thermaggregans,* and *M. uliginosum*. Quantities other than 100 gm may be used, depending upon the size of tank 115. A conduit 116 connects tank 115 to a normally-closed valve 118. A conduit 119 connects valve 118 to a disposal vessel 130. When valve 118 is opened, the contents of tank 115 flow into disposal vessel 130 via conduit 116, valve 118, and conduit 119.

A urine reactants tank 145 receives urine from commode 100 and valve 110 when actuator 111 is in its right-most position. A seed 150 of yeast, microorganisms, and algae in various proportions is added to tank 145 via a conduit 151, or more commonly, by pouring from a container. Seed 150 contains any of algae strains *Anabaena, Chlamydomonas, Chlorella, Isochrysis, Laminaria, Nostoc, Oscillatoria, Pandorina, Porphyra, Sargassum, Scenedesmus, Spirulina,* and *Turbinaria* plus microorganisms including the bacteria *Nitrosomonas* and *Nitrobacter*. A storage container 160 is connected to tank 145 by a conduit 159. A conduit 164 connects container 160 to a spigot 175 via a pump 170. A hand washing station 165 is positioned beneath spigot 175 so that water 176 that leaves spigot 175 and can be used to wash a user's hands (not shown), whereafter the water flows into commode 100 via a conduit 166. Alternatively, hand washing station 165 is positioned over commode 100 so that conduit 166 is not required. Tank 145 varies in capacity from about 100 liters for a family of four to about 45 kiloliters for a stadium housing 10,000 people. Other sizes and a plurality of tanks are used to address different situations. The dimensions of a 100-liter tank 145 can be 1 meter long, 40 cm wide, and 30 cm high, but other dimensions can be used and of course larger dimensions would be used for tanks with a larger capacity.

Operation

In preparation for using commode 100, a user turns actuator 111 to its proper position for collection of urine-only (actuator 111 is turned to the right) or collection of feces or feces-plus-urine (actuator 111 is turned to the left), according to their intent. The user then deposits their waste into commode 100 and closes valve 110 by returning actuator 111 to its center position.

Alternatively, valve 110 can be left in its closed position while the user deposits waste into commode 100. When the user is finished, they turn actuator 111 to the proper position according to the waste deposited, wait while the waste leaves commode 100, then close valve 110. Valve 110, if electrically controlled, may be automatically returned to the closed position after a suitable delay in case the user forgets to return it.

If the user deposits feces or feces-plus-urine, the contents of commode 100 are delivered to tank 115 via conduit 112, whereupon the organisms from seed 120 digest the contents of tank 115 when the organisms are present in tank 115. Seed 120 digests the contents of tank 115 until it has reached a predetermined point, i.e., the components of the feces are decomposed to a flowable sludge. Then an operator (not shown) opens valve 118 and the contents of tank 115 flow through valve 118 and conduit 119 and into disposal vessel 130 from which they are removed and used for soil conditioner with similar benefits to peat as well as fertilizer, or sent to landfill if levels of toxic constituents are thought to be sufficiently high.

If the user deposits urine-only, the contents of commode 100 are delivered to tank 145 via conduit 140 and treatment of the urine commences, as described below.

Commode 100 occasionally requires rinsing, although the need for rinsing is reduced by the non-stick coating mentioned above. Water 176 that runs off a user's hands as they are washed at hand washing station 165 flows into and washes commode 100. If feces are present in commode 100, a user operates valve 110 so that conduit 105 is connected to conduit 112 and the water and feces are directed into tank 115. Alternatively, a user can direct a flow of urine against feces that are present in commode 100 and similarly direct the mixture of feces and urine into tank 115.

FIRST EMBODIMENT

Figure 2:
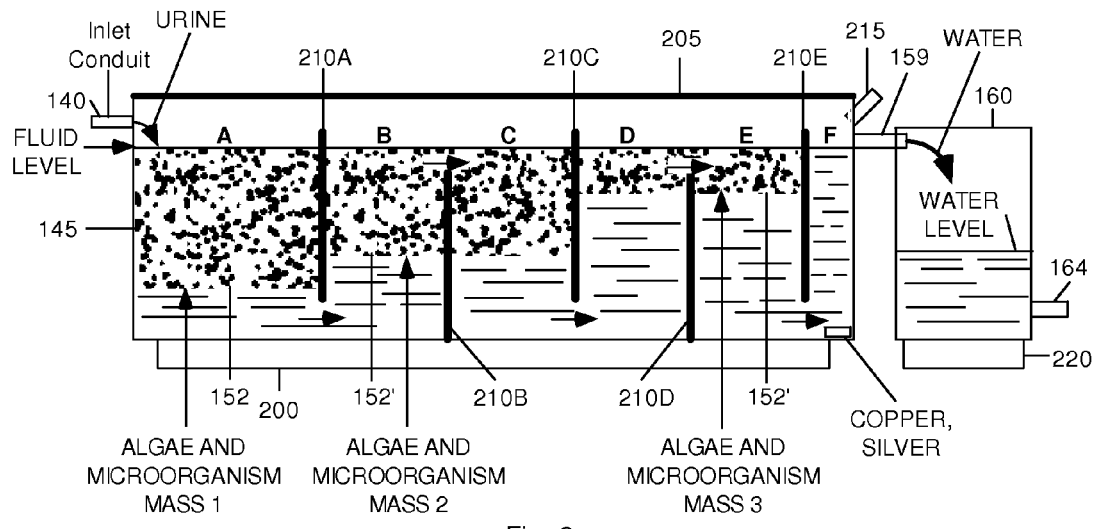
FIG. 2 shows apparatus and stages in the progression of the treatment of urine.

Urine Treatment—FIGS. 1 and 2—Apparatus

FIG. 2 shows a side-sectional view of tank 145 for processing urine according to one aspect of the present embodiment. An optional base 200 supports tank 145 and an openable lid 205 covers the tank. Lid 205 is transparent or translucent to admit sunlight to promote the growth of algae and other microorganisms (hereafter referred to as algae) within tank 145, and also to permit inspection of the contents while preventing evaporation of the liquid within tank 145. When open, lid 205 permits access to the algae cultures in tank 145.

A plurality of vertical baffles 210 divide tank 145 into sections. Baffles 210 are affixed to the front and rear sides of tank 145. Baffles 210A, 210C, and 210E extend above the fluid level within tank 145 and extend downward to a point above the bottom of tank 145. Baffles 210B and 210D extend upward from the bottom of tank 145 to a point below the fluid level within tank 145.

A first chamber A is formed between the left-hand end of tank 145 and baffle 210A. Fluids entering this first chamber must flow downward and underneath baffle 210A as they exit this chamber.

A second chamber B-C is formed between baffles 210A and 210C. Fluids entering this second chamber flow upward in the region between baffles 210A and 210B, and then downward in the region between baffles 210B and 210C, finally exiting beneath baffle 210C.

A third chamber D-E is formed between baffles 210C and 210E. Fluids entering this third chamber flow upward within the region between baffles 210C and 210D, and then downward in the region between baffles 210D and 210E.

Finally the fluid flows beneath baffle 210E into the last chamber F at the right-hand end of tank 145. The fluids flow up through this chamber where they exit tank 145 via conduit 159. Baffles 210 cause urine to flow downward and upward through successive, separate layers of floating algae so that the concentration of the waste products in the urine decreases with passage through each chamber.

Any number of baffles can be used to form any number of chambers within tank 145.

The vertical position of conduit 159 is lower than that of inlet conduit 140 so that normally open conduit 159 determines the fluid level within tank 145. Conduit 159 must be lower than the upper end of baffles 210A, 210C, and 210E so that fluids do not flow directly from inlet 140 to outlet conduit 159. Instead the fluids must pass through all chambers between inlet conduit 140 and conduit 159. The fluid flowing out of conduit 159 flows into storage tank 160, which receives the water purified from treated urine, as explained below. Tank 160 is also supported by an optional base 220. Bases 200 and 220 are used when the surface beneath tanks 145 and 160 is irregular, sloped, or moisture-laden.

A vent 215 permits the escape of gaseous respiration products formed within tank 145 and also admits oxygen when required. Some yeast, algae, and microorganisms are aerobic, i.e., they require oxygen for respiration. Others are anaerobic, i.e., do not require oxygen for respiration. In general there will be a mixture of the two types of organisms.

Tanks 145 and 160 and conduits 140, 159, and 164 are made of metal, plastic including, but not limited to, polyvinyl chloride (PVC) and acrylonitrile butadiene styrene (ABS), fiberglass, rubber, or a combination of these materials. Lid 205 is made of a translucent material such as glass or plastic.

Process Steps

To start the purification process tank 145 is first filled with water up to the level of conduit 159. Next, seed 150 is added to all chambers except chamber F.

In one exemplary aspect, tank 145 holds 100 liters and is suitable for use by a family of four people. Such a family will deposit, at various times each day, a total of about three liters of urine. Since urine contains about 5% nutrients, about 0.15 liter of nutrients are deposited via conduit 140 into tank 145 each day.

Chamber F holds 33 liters and chambers A through E hold 67 liters. Seed 150 (FIG. 1) contains about 100 g of the bacteria *Nitrosomonas* and *Nitrobacter*, plus any or all of the algae strains previously listed. A user deposits seed 150 roughly equally among chambers A through E of tank 145. The algae strain that will become dominant depends on growth conditions and is not known at the start of the process. Temperature, light, urine waste contents, and algae that may be present in locally obtained water are controlling factors in determining the dominant algae species. Initially, 100 g of seed 150 is provided with 15 g of nutrients (assuming urine has a specific gravity of unity) in the first 24 hours.

The rate of growth of algae and bacteria in seed 150 after it has been introduced into the water in tank 145 depends on ambient temperature, the amount of sunlight passing through lid 205, and the amount of nutrients available. In the present example, each cell of the seed algae multiplies itself 32 times in 24 hours with unlimited amounts of nutrients. However algal growth will slow as the concentration of nutrients decreases since existing algae retain the nutrients they have absorbed. We prefer to overwhelm the amount of nutrients with algae to be sure all the nutrients are absorbed. In general if temperature and sunlight are sufficient, the nutrients in the urine will be absorbed completely within two days of entering reactants tank 145.

The first introduction of urine into tank 145 creates a very mild nutrient solution, thereby starting replication of the algae. The rate of growth of algae as a function of nutrients and environmental factors is well-known. Some algae strains double as much as 5 times a day under ideal conditions. Upon the first introduction of nutrients there is a slight lag and then an exponential growth of algae that continues to the limit of the nutrients. Hence there is a need for periodic cleanout of algae from tank 145, typically once per day. Each time algae are removed from tank 145, enough are left behind, about 10%, to seed the next generations of algae.

The initial volume of seed 150 used in this example is larger than required for the present size of tank 145. A too-small volume of seed 150 would permit untreated urine to reach chamber F of tank 145 during the first day of operation. Thus it is better to add more, rather than less. Seed 150 is inexpensive and is only required at the start of the purification process.

Urine admitted to tank 145 via conduit 140 admixes with the mixture of urine and water that is already in tank 145. All urine that is added to tank 145 flows from left-to-right and exits after treatment via conduit 159.

The algae mass within chamber A at the left in FIG. 2 ingests a portion of the nutrients within the urine as the urine flows downward toward the exit of chamber A beneath baffle 210A. The impurities in the urine, i.e., nutrients for the algae, are absorbed by the algae as the urine flows downward through the algae mass in the first chamber. Therefore the concentration of impurities is lower at the bottom than it is at the top of the algae mass in the first chamber.

More impurities are absorbed as the fluid flows upward through section B of the second chamber, over baffle 210B, and then downward via section C of the second chamber on its way to the exit of section C beneath baffle 210C. Similar absorption occurs in the third chamber where sections D and E are separated by baffle 210D.

By the time the water reaches chamber F, to the right of baffle 210E, no algae are present because only water remains at that point and no nutrients are available. Thus the water is essentially potable and suitable for washing hands. In the event that some algae enter the last chamber, silver or copper metal can be placed in that chamber. These metals are toxic to the algae, while harmless to humans and animals. This metallic purification technique is mentioned in the Schuh '030 patent supra.

The algae within seed 150 have a specific gravity that is less than that of the fluid in tank 145 so as they grow, they form a mass 152 that floats and remains within each chamber. The mass of algae grows and expands with the addition of the nutrients in urine, as discussed below. The mass of algae within each chamber is permitted to grow only until it reaches a point near to but above the bottoms of baffles 210A, 210C, and 210E. Periodic inspections reveal when the algae reach this level in a given chamber. When they reach this level in any chamber, an operator opens lid 205 manually removes and discards a portion of the algae mass in this chamber. Removal is done with a ladle, a shovel, a siphon, a pump, or other means.

Healthy human urine consists principally of water and urea plus a number of other chemical species in smaller amounts, including ammonium ions. The majority of these chemicals are absorbed by either the algae or bacteria, or both, in the list below.

As stated above, seed 150 contains any of algae strains *Anabaena, Chlamydomonas, Chlorella, Isochrysis, Laminaria, Nostoc, Oscillatoria, Pandorina, Porphyra, Sargassum, Scenedesmus, Spirulina*, and *Turbinaria*, plus microorganisms including the bacteria *Nitrosomonas* and *Nitrobacter*. The mix of strains that evolve to be dominant in reactants tank 145 can only be known after the fact as many environmental conditions affect which of the different strains will be most biologically successful. Growth behavior and lipid accumulation of algae are strongly related to nitrogen concentration in the media. This is true for green algae such as *Chlorella vulgaris* and blue green algae such as *Spirulina platensis*. If necessary, a nitrogen-fixing cyanobacteria co-cultured with a lipid-rich algae may be used to form a synergistic relationship allowing the total biomass density to expand above estimates for either alone. The ammonium ion in urine is oxidized by bacteria *Nitrosomonas* and *Nitrobacter*. These degradative bacteria are reasonably common and widespread.

Algae 152 will absorb the 16 elements needed for their growth that are contained in the urine. These elements are carbon (C), hydrogen (H), oxygen (O), phosphorus (P), potassium (K), nitrogen (N), sulfur (S), calcium (Ca), iron (Fe), magnesium (Mg), boron (B), manganese (Mn), copper (Cu), zinc (Zn), molybdenum (Mo), and chlorine (Cl). Algae are very efficient at sequestering these nutrients when present in their environment. The macro-nutrients nitrogen (N), phosphorous (P), and potassium (K) are present typically in a N-P-K ratio around 11:1:2.5 to 10:1:4, similar to some commercial fertilizers. The phosphorous is in a plant-usable form requiring no additional processing before it can be absorbed. Thus the algae, which are periodically removed from tank 145, constitute a high quality fertilizer for crops.

After a period of operation, ambient algae and microorganisms will colonize the fluid within tank 145. They find their way into tank 145 via the air, tools that are used in the maintenance of tank 145, and the like.

There are visual, auditory, and olfactory sensory outcomes that accompany use of our device. The visual appearance is a clean and empty commode, rinsed when necessary as described above, that contrasts with the pit or chemical toilet most common in the portable market today, even in developed countries. With our device a new user will not experience any evidence of the activities of the previous user. The visual appearance is not repulsive as is commonly the case with pit and chemical portable toilets. Auditory sensations are muted by the lack of fluids in our device compared to the current pit and chemical toilet alternatives. There is no splashing. Olfactory sensations are generally of a clean and pleasant device with little or no odors of human waste or the smell of chemical toilets.

Overall, the experience is similar to an indoor commode, but it does not require any outside and frequently substantial water source as a delivery medium to move the deposit to the centralized and perhaps distant and vulnerable sewage treatment facility.

Our device will be able to replace both the traditional outdoor toilet and the conventional toilet. Urine is made a resource and not a waste product. The algae that grows can be converted to feed or fuel by related devices. The water can be used for hand washing, which is its most important use for disease control. This device produces water for hand washing, rather than requiring an external water source to do that as other currently available devices.

There are also economic and ecological outcomes to using this device to replace current alternatives. The economic outcome is a ready source of algae feedstock for conversion to feed or fuel. The ecological outcome is the productive use of what was previously regarded as a waste product. There is no infrastructure required to transport the human waste to a distant location for additional treatment. The cost savings is substantial. There is no chance of contamination of the environment if there is heavy weather, which could cause the traditional sewage transportation devices to overflow. All bioremediation is accomplished on site where the human waste is first deposited. There is no seepage of contents to ground water as most of the feces is converted to the mixture of gases that constitute sour methane within an enclosed digester. Such sour gas (a mixture of methane and hydrogen sulfide) can be used as an alternative fuel for cooking, heating, hot water or running electrical generating devices. Our device produces fuel whereas other devices require an external fuel source. Any solid waste left after methane conversion is suitable for agricultural uses. There is no pollution.

CONCLUSIONS, RAMIFICATIONS, AND SCOPE

We have devised a system for treating urine that is collected separately from feces in a commode. The feces are delivered to a methane digester apparatus. The urine is directed into a partitioned tank comprising a series of chambers. Each chamber contains a culture of algae and microorganisms that consume waste products in the urine as nutrients, thereby removing them from the remaining water. After passing through a succession of chambers containing algae and microorganisms, the purified water is stored in a final chamber that contains little or no algae or microorganisms. This purified water is sufficiently pure for drinking and washing hands. In the event that some algae or microorganisms enter the final storage chamber, they are easily eliminated by the addition of silver or copper metal to the chamber. The apparatus and method provide a low-cost, low-energy, easily transportable system for processing human waste, especially in remote environments. The ability to wash one's hands after using the commode helps to reduce the spread of disease.

While the above description contains many specificities, these should not be construed as limitations on the scope, but as exemplifications of some aspects of the embodiment shown. All aspects of the embodiment are scalable to any size and to handle any volume of material. There can be any number of treatment chambers from two upward. The chambers can all contain the same microorganisms and algae or successive chambers can contain different species. Instead of using a commode, a user can urinate directly into the first chamber of the treatment tank, or can urinate first into a vessel and then pour the contents of the vessel into the first chamber of the tank. Instead of a vent in the wall of the tank, a vent can be provided in the lid that covers the tank.

The algae may be harvested and processed to be fertilizer for crops, food for humans or livestock, or be a feedstock for ethanol, methane, and biodiesel production.

This bioremediation of human sanitary waste wherein the growth of the algae converts the urine to a drinking water standard provides a hand washing opportunity for cleaning soiled body parts which upgrades the toilet to a lavatory by definition. Being portable our system provides for hand washing in field locations such as truck farms where field hands have not previously had hand washing facilities.

Thus, the scope should be determined by the appended claims and their legal equivalents, and not only by the examples given.

The invention claimed is:
1. An apparatus for converting urine into potable water, comprising:
a urine reactants tank having an inlet at a first end, an outlet at a second end, a top, and a bottom, said inlet being positioned beneath said top and higher than said outlet, said urine reactants tank further including first, second, and third baffles, each having a top end and a bottom end,
said top end of said first baffle being lower than said top of said urine reactants tank and above said outlet, and said bottom end of said first baffle being above said bottom of said urine reactants tank, and
said top end of said second baffle being lower than said outlet and said bottom end of said second baffle being at said bottom of said urine reactants tank, and
said top end of said third baffles being beneath said top of said urine reactants tank and above said outlet, and said bottom end of said third baffle being above said bottom of said urine reactants tank,
said baffles thereby forming a plurality of connected chambers within said urine reactants tank, a first of said chambers being formed between said first end of said urine reactants tank and said first baffle, a second of said chambers comprising first and second contiguous sections, said first section of said second chamber being formed between said first baffle and said second baffle, said second section of said second chamber being formed between said second baffle and said third baffle, and
a seed that contains organisms in said first and said second chambers in said urine reactants tank, said organisms being selected from the group consisting of algae, yeast, and microorganisms,
whereby when said urine is introduced into said first of said chambers in said urine reactants tank, said organisms of said seed will extract nutrients from said urine as said urine flows from said first chamber, beneath said first baffle and into said first section of said second chamber, over said second baffle and into said second section of said second chamber, downward beneath said third baffle and into said third chamber, so that said urine flows upward and downward through said organisms, thereby removing waste products from said urine and converting said urine into potable water that flows into said third chamber and leaves said third chamber and said urine reactants tank via said outlet.

2. The apparatus of claim 1 wherein said organisms are selected to have a specific gravity that is less than that of water so that said organisms float within said chamber.

3. The apparatus of claim 1, wherein said urine reactants tank contains two of said chambers that are separated by said first of said baffles and said seed is introduced only into said first chamber, and said second chamber contains only one of said sections, and said outlet is connected to said second chamber, whereby said urine is purified by said algae in said first chamber and said potable water leaves said second chamber and said urine reactants tank via said outlet.

4. The apparatus of claim 1, further including a lid on said urine reactants tank, the optical properties of said lid being selected from the group consisting of transparent and translucent, so that the contents of said urine reactants tank can be seen but are prevented from evaporating therefrom.

5. The apparatus of claim 1, further including a second conduit, and a storage container, said second conduit being having a first end connected to said urine reactants tank and a second end connected to said storage container, whereby said second conduit conducts said potable water from said urine reactants tank to said storage container.

6. The apparatus of claim 5, further including a pump, a third conduit connected between said pump and said storage container, a spigot, a fourth conduit connected between said pump and said spigot, and a hand-washing station beneath said spigot, whereby when said pump is activated, said potable water flows from said storage container via said third conduit to said pump and then to said spigot via said fourth conduit and flows from said spigot into said hand washing station.

7. The apparatus of claim 5 wherein said urine reactants tank, said storage container, and said conduits are made of materials selected from the group consisting of metal, plastic, fiberglass, rubber, and a combination of metal, plastic, fiberglass, and rubber.

8. The apparatus of claim 1, further including
a feces reactants tank,
a commode for collecting waste selected from the group consisting of urine-only, feces, and feces-plus-urine, said commode having a bottom output,
a valve connected to said bottom output of said commode and first and second outputs and first, second, and third selectable operating positions,
said first output connected to said urine reactants tank, and
said second output connected to said feces reactants tank,
said valve in said first operating position being off so that said waste remains within said bowl,
said valve in said second operating position allowing urine to pass through said first output into said urine reactants tank,
said valve in said third operating position allowing waste containing feces to through said second output into said feces reactants tank,
whereby when said waste contains said urine only, said valve can be placed in said second position so that said urine-only flows into said urine reactants tank, and when said waste contains said feces or said feces-plus-urine said valve can be placed in said third position so that said feces or said feces-plus-urine flow into said feces reactants tank, so that said urine-only is collected separately from said feces or said urine plus feces.

9. A method for converting urine comprising waste products and water into potable water, comprising:
providing a tank having a top, bottom, and sides,
providing a plurality of serially connected chambers within said tank, a first of said chambers being arranged to receive said urine,
providing a conduit below said top of said tank and extending from a second of said chambers to a point outside said tank,
providing at least one baffle secured to said sides of said tank and extending from a point above said bottom of said tank upward to a point higher than said conduit,
providing a seed containing organisms, said organisms being selected from the group consisting of algae, yeast, and microorganisms and having a specific gravity less than that of water so that they float in water,
placing said seed in said first of said chambers,
whereby when said urine contacts said seed, said organisms grow within said first chamber and consume said waste products as nutrients within said urine in said first chamber so that said first chamber contains only said water and said organisms, and only said water flows beneath said baffle into said second chamber, leaving said organisms and said waste products in said first chamber so that said water in said second chamber is potable and can be removed from said second chamber for use.

10. The method of claim 9, further including providing a storage container and joining said storage container with said tank using said conduit, whereby when said water in said tank reaches the level of said conduit, said water flows through said conduit and into said storage container.

11. The method of claim 10, further including providing a pump, providing a first conduit between said pump and said storage container, providing a spigot, providing a second conduit between said pump and said spigot, and providing a hand washing station beneath said spigot, whereby when said pump is activated, said potable water flows from said storage container via said first conduit to said pump and then to said spigot via said second conduit and flows from said spigot into said hand washing station.

12. The method of claim 9, further including providing a lid hingedly secured to said tank whereby when said lid is opened, said seed can be introduced into said first chamber in said tank and said organisms in said first chamber of said tank can be removed.

13. The method of claim 12, wherein said lid is transparent or translucent.

* * * * *